May 21, 1968   W. P. MOYLAN   3,383,744
STUFFER-CRIMPER IMPEDING APPARATUS
Filed July 20, 1966   5 Sheets-Sheet 1

INVENTOR.
WILLIAM P. MOYLAN
BY *Patrick L. Henry*
ATTORNEY.

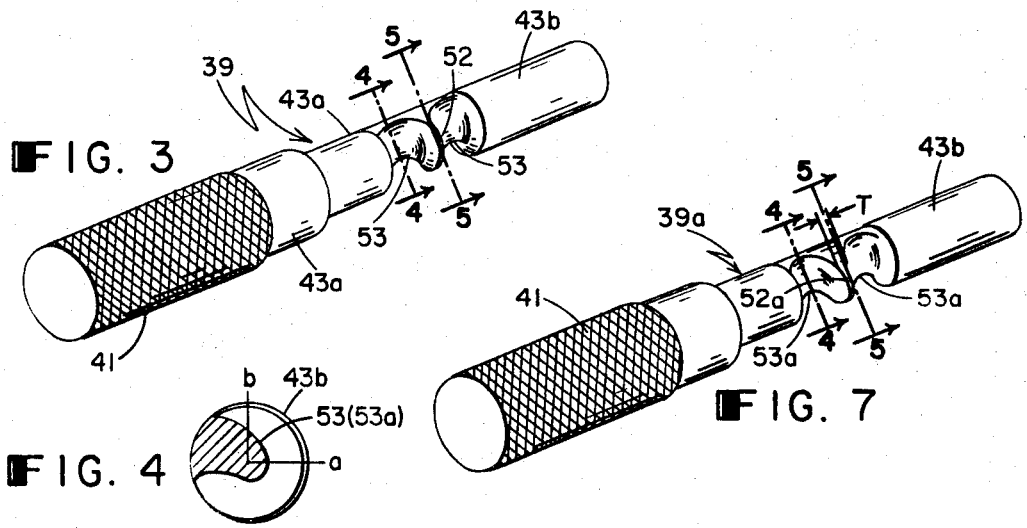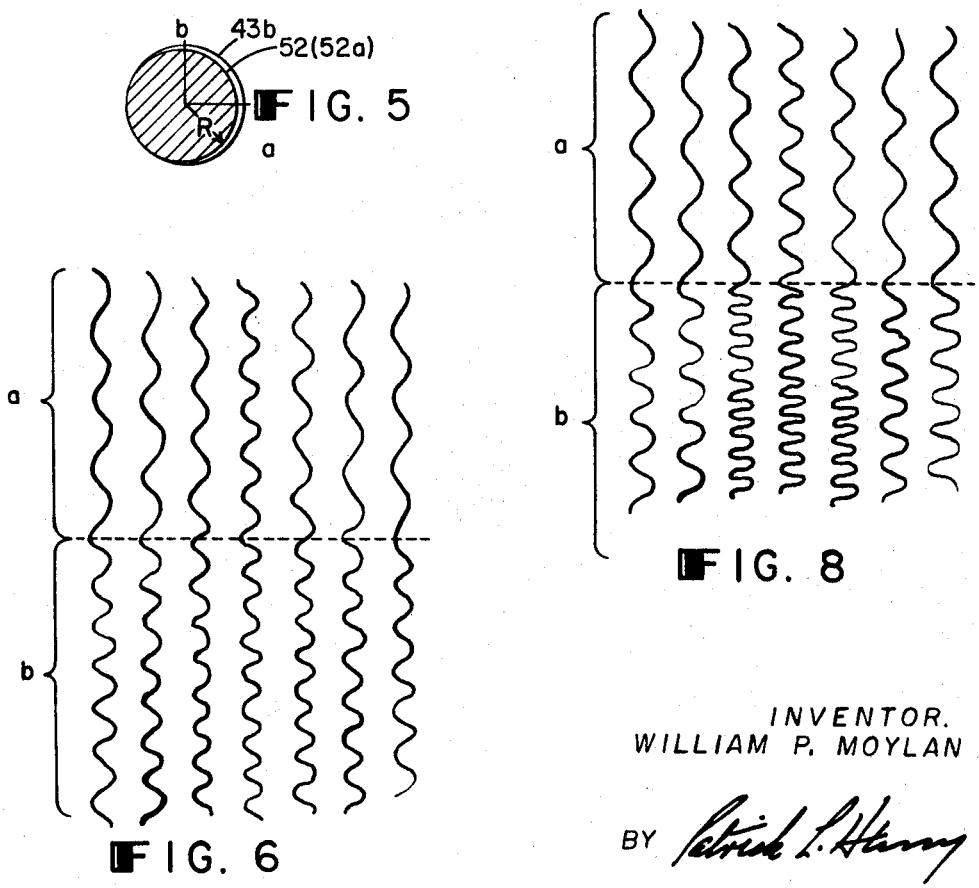

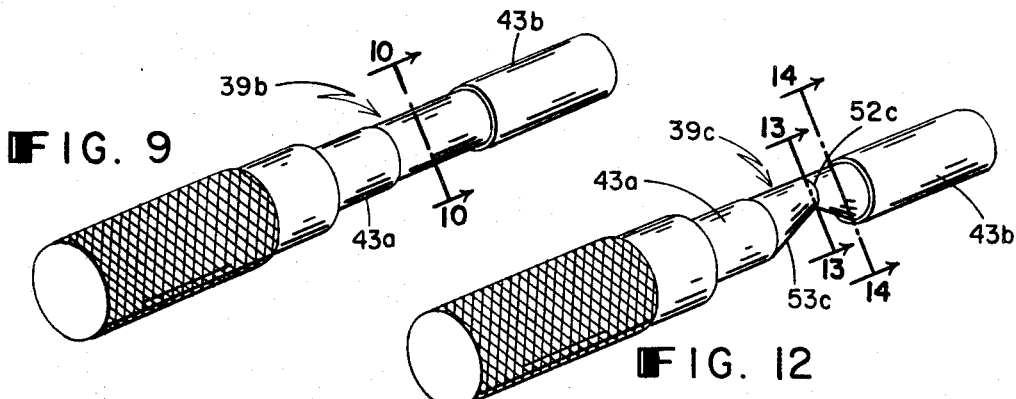
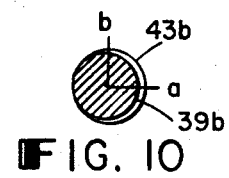
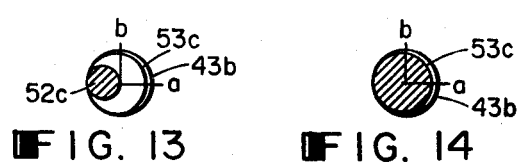
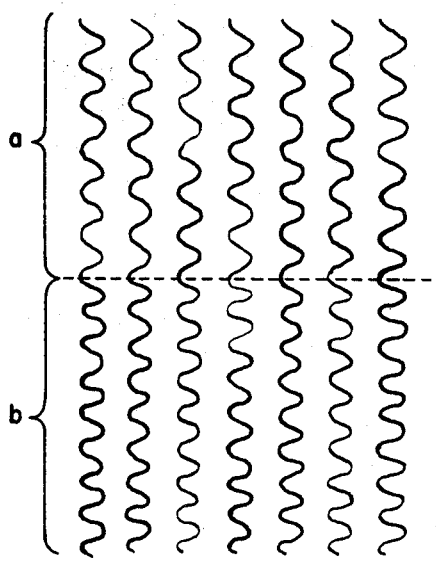
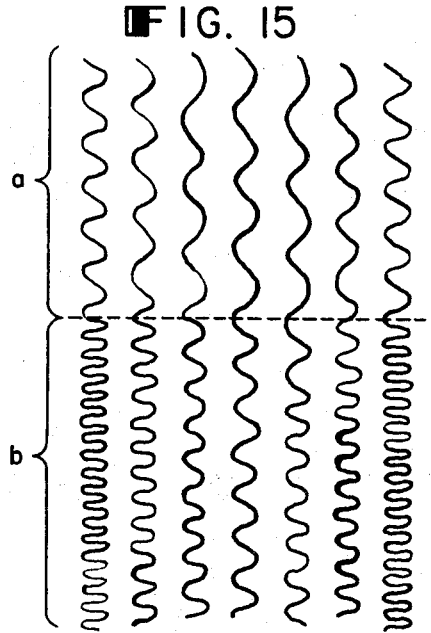
INVENTOR.
WILLIAM P. MOYLAN

May 21, 1968 W. P. MOYLAN 3,383,744
STUFFER-CRIMPER IMPEDING APPARATUS
Filed July 20, 1966 5 Sheets-Sheet 4

INVENTOR.
WILLIAM P. MOYLAN
BY
ATTORNEY.

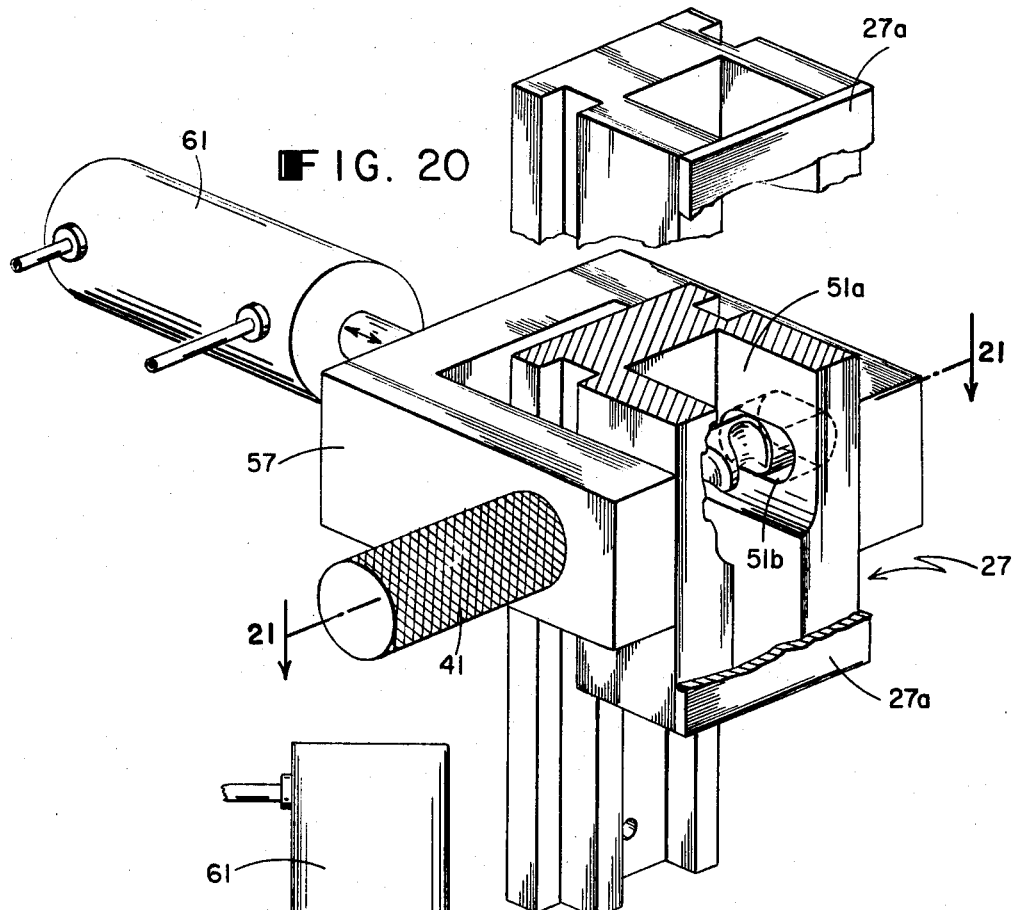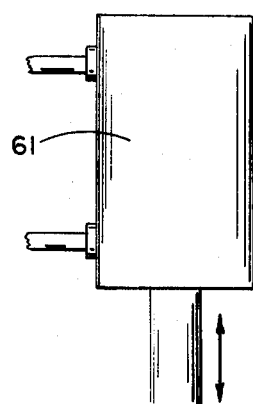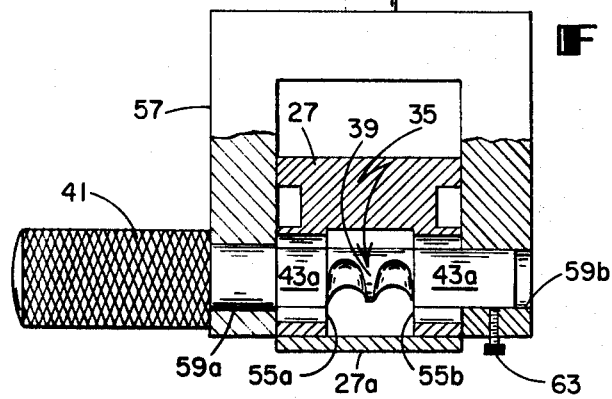

United States Patent Office 3,383,744
Patented May 21, 1968

3,383,744
STUFFER-CRIMPER IMPEDING APPARATUS
William P. Moylan, Nashua, N.H., assignor to Foster Grant Co., Inc., Leominster, Mass., a corporation of Delaware
Filed Juy 20, 1966, Ser. No. 566,542
27 Claims. (Cl. 28—1)

ABSTRACT OF THE DISCLOSURE

An apparatus for crimping yarn bundles in which an impeding mechanism, such as a cam having a variable cross section, is projected into the crimping chamber of a stuffer box crimper, for causing the yarn to crimp as it is fed through the chamber.

---

This invention relates to a method and apparatus for crimping yarn. More particularly it relates to a novel method and apparatus for crimping continuous multifilament yarn bundles by the use of an impeding mechanism projecting into the crimping chamber of a stuffer box crimper to provide a retarding force on the yarn to be crimped as it passes through the stuffing box.

In stuffer box crimpers, a yarn bundle is generally fed at a relatively high speed (e.g. about 1200 yards per minute) into the stuffing chamber having an impediment therein. This causes the yarn to double back on itself and becomes crimped in the stuffing chamber. This crimping operation provides a yarn bundle which is flexible and has a greater bulk and resilience than uncrimped yarn. Uses for such yarn are found in the manufacture of stretch fabrics, carpets, etc.

It is an object of this invention to provide a simple crimping method and apparatus which provides for a minimum number of moving parts and close control of the crimp characteristics of the yarn to be crimped. It is a further object of this invention to provide a crimping method and apparatus which is capable of producing a varying crimp profile across the yarn bundle; and also a varying degree of crimp along the length of the yarn bundle.

Further objects will become apparent from the following description of the invention.

The presently preferred embodiment of the invention comprises a stuffer box crimper 25 having a stuffing chamber 51, and nip rolls 31 adapted to feed the yarn bundle 33 into the stuffing chamber; and is characterized by a unique cam-like impeding mechanism 35 projecting into said chamber. By projecting this cam-like impeding mechanism 35 more or less into the stuffing chamber 51, greater or less impedance is provided, and thus a greater or lesser degree of crimp is imparted to the yarn depending on the amount of resistance or retardance provided by the impeding mechanism 35. An important feature of this invention is the provision of a cam having a variable cross section so that the crimp profile imparted to the yarn bundle may be varied. Additionally, the cam member may be mounted for sliding movement into and out of the stuffing chamber. The empeding member of this invention is characterized by being of simple design such as to provide a crimping operation which is relatively free from time consuming repairs and replacements. As the specification will show, the invention is susceptive of several variations.

In the description of the invention, the term "degree of crimp" is used to define the severity of crimp imparted to a given filament or filaments in the yarn bundle, while the term "crimp profile" is used to characterize the variation in degree of crimp across a given yarn bundle. The "radius" R of the cam impeding member is the distance from the axis of rotation of the cam member measured to any given point on the surface of the cam (e.g. FIG. 5); and the "thickness" T of a given portion of the cam member is the effective width of the cam measured along its axis of rotation and transversely of the length of the yarn bundle (e.g. FIG. 7).

Description of invention

In the drawings:

FIG. 3 is a perspective view of one of the embodiments of the impeding cam.

FIG. 4 is a section taken along lines 4—4 of FIGS. 3 and 7.

FIG. 5 is a section taken along lines 5—5 of FIGS. 4 and 7.

FIG. 6 is a stylized showing of the crimp variation across and along the crimped yarn bundle produced by the cam of FIG. 3.

FIG. 7 is perspective view of another embodiment of my invention.

FIG. 8 is a stylized showing of the crimp variation across and along the crimped yarn bundle produced by the cam of FIG. 7.

FIG. 9 is a perspective view of another embodiment in which the impeding cam has a uniform cross section.

FIG. 10 is a sectional view taken along lines 10—10 of FIG. 9.

FIG. 11 is a stylized showing of the crimp variation across and along the crimped yarn bundle produced by the cam of FIG. 9.

FIG. 12 is a perspective view of yet another embodiment of the invention.

FIG. 13 is a sectional view taken along lines 13—13 of FIG. 12.

FIG. 14 is a sectional view taken along lines 14—14 of FIG. 12.

FIG. 15 is a stylized showing of the crimp variation across and along the crimped yarn bundle produced by the cam of FIG. 12.

FIG. 20 shows another embodiment of the invention wherein the impeding cam may be moved horizontally more or less into the path of the yarn.

FIG. 21 is a sectional view taken along lines 21—21 of FIG. 20.

Figure 1:
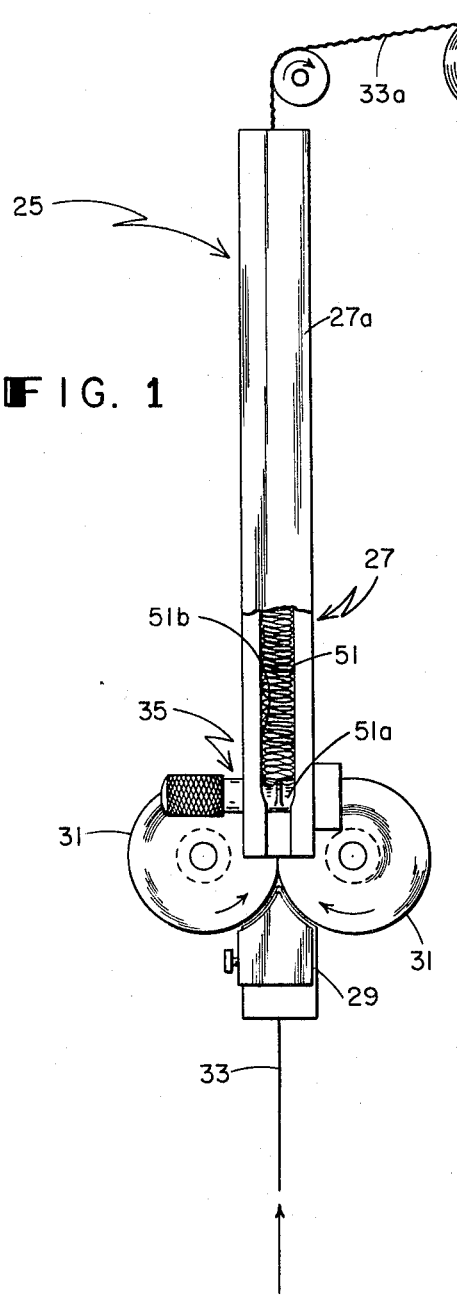
FIG. 1 is a front elevation of the stuffer box and impeding means of the invention.

Referring to FIG. 1, the crimping mechanism utilized is that generally known as a stuffer box crimper 25 one example of which is shown in List et al. U.S. Patent No. 3,027,619. It comprises a stuffer box 27, guide 29 and nip rolls 31 to feed the yarn bundle 33 into stuffer box 27 and against the impeding means 35. The crimped yarn 33a is generally wound under tension onto package 37 for subsequent processing.

The preferred impeding means 35 comprises a cam portion 39, a handle 41 and bearings 43a, 43b. The bearings 43a and 43b ride in cylindrical bushings 45a, 45b respectively; and the impeding means is fixed in place by set screw 47 mounted to project through collar 49 affixed to stuffer box 27. In order to provide for simple insertion and removal of the impeding mechanism 35, it has been designed so that it may be inserted and removed without dismantling any other part of the stuffer box. This is accomplished by designing the surface of cam portion 39 so that a cross section thereof taken transversely of the axis of rotation falls within the area defined by the cross section of the largest bearing member. (See FIGS. 4, 5, 10, 13, 14, 17 and 18.) In this manner the impeding mechanism can be simply inserted through the bushing holes 45a, 45b and locked in place by set screw 47. In the preferred embodiment, the bearings 43a, 43b are the same diameter. However, the outer bearing 43b and bushing 45b could be smaller than the cam 39 as long as the cam is smaller than the bushing hole 45a through which it has to be inserted.

Figure 2:
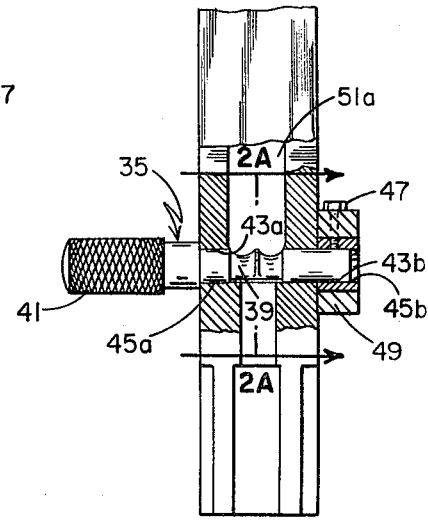
FIG. 2 is an enlarged detailed view of the impeding cam.
Figure 2A:
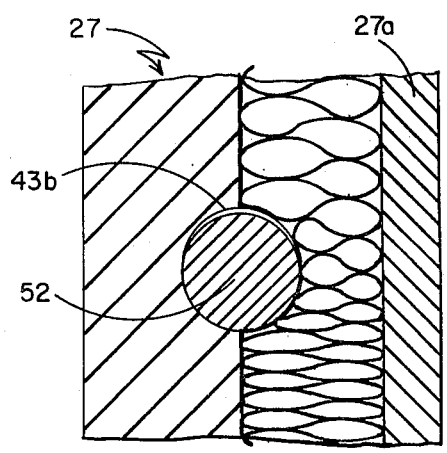
FIG. 2A is a sectional view taken along lines 2A—2A of FIG. 2.

As shown in FIG. 2A the impeding cam 39 projects into the lower chamber 51a of the stuffer box 27 and impedes the passage of the yarn through the stuffer box at this point. This pressure or resistance against the yarn being fed into the chamber 51a at linear speeds of e.g. 1200 yards per minute urges the fibers to double back on one another in zig-zag fashion to form the crimp in the yarn. As the crimped yarn slides past the impeding cam, 39, it moves into the upper chamber 51b of the stuffer box and is subsequently withdrawn onto package 37. It has been found that the crimp profile can be varied across the fiber bundle by providing an impeding cam 39 of varying cross section. The degree of crimp imparted to the yarn is generally dependent on the extent of penetration of cam member 39 into stuffing chamber 51a.

FIG. 3 shows one embodiment of the invention wherein the mid portion 52 of the cam 39 is in the form of an effective edge of substantially constant thickness measured in the direction of the axis of rotation of the impeding mechanism. Cam portion 39 will project more or less into the chamber 51a as it is adjustably rotated on bearings 43a, 43b due to its eccentric relation to its axis of rotation. The mid portion 52 is flanked by side portions 53 which penetrate a lesser distance into the chamber 51a at the minimum radius of mid portion 52.

Since the radius of the side portions 53 increases at a more rapid rate than the radius of the mid portion 52, the rate of penetration of the side portions 53 will be greater relative to the rate of penetration of the mid portion 52 as the cam is rotated clockwise to increase its penetration; thus the degree of crimp will increase at a more repaid rate at the lateral edges of the fiber bundle as the cam 39 is rotated 90° in a clockwise direction from a position wherein line a (FIG. 4) is in a horizontal plane to a position wherein line b is in a horizontal plane. The change in the crimp profile across the fiber bundle produced by this 90° relocation of the cam 39 can be seen by comparing parts a and b of FIG. 6. Part a of FIG. 6 represents a characteristic crimp profile when line a of FIG. 4 is horizontal and the cam mid portion 52 is at its point of minimum penetration. Part b of FIG. 6 represents a characteristic crimp profile when the cam has been rotated 90° in a clockwise direction to a position wherein line b is in a horizontal plane thereby increasing the penetration of the cam into the chamber 51a.

A comparison of parts a and b of FIG. 6 shows that the degree of crimp is generally increase as the cam is rotated into the stuffing chamber; and the crimp profile across the yarn bundle is varied—the degree of crimp in the strands adjacent the lateral edges of the fiber bundle increasing to a greater extent than the crimp in the fibers at the center of the bundle.

It will be understood that a typical fiber bundle to be crimped may contain many more monofilaments than shown in FIG. 6 and that the variations across the bundle may be much less precise or pronounced. However, it has been found that there is a definite relationship between the penetration of a given portion of the impending cam 39 and the crimp characteristics in the corresponding portion of the fiber bundle.

FIG. 7 shows an embodiment similar to that of FIG. 3 wherein the effective edge of mid portion 52a of cam 39a becomes gradually thicker as it progresses around the circumference of the cam. In this embodiment the amount of high crimped yarn increases as the cam 39a is rotated in a clockwise direction to increase its penetration into the chamber 51a; due to the widening of the mid portion 52a so that it affects a wider portion of the bundle. The side portions 53a are substantially similar to those of FIGS. 3 and 4.

A comparison of parts a and b of FIG. 8 shows that the percentage of fibers affected by mid portion 52a varies as the cam is rotated—the degree of crimp generally increasing as the cam is rotated into the stuffing chamber, and the percentage of tightly crimped fibers at the mid portion of the fiber bundle increasing due to the widening of the mid portion 52a of the cam.

FIG. 9 shows an embodiment having a cam 39b of uniform cross section (FIG. 10) across the width of the chamber 51a. In this embodiment the degree of crimp is substantially the same across the width of the fiber bundle (part b of FIG. 11) and may be uniformly increased as shown in FIG. 11b by rotating the cam 39b in a clockwise direction.

A comparison of parts a and b of FIG. 11 shows that the degree of crimp is generally increased as the cam is rotated into the stuffing chamber, with no change in the crimp profile across the fiber bundle.

FIG. 12 shows a slightly different embodiment wherein the mid portion 52c of the cam 39c is recessed (see FIG. 13) and the side portions 53c thereof penetrate farther into the chamber (FIG. 14). This cam 39c will produce a yarn bundle having a higher degree of crimp at the lateral edges thereof than in the middle part a of FIG. 15. Rotating the cam in a clockwise direction will increase the degree of crimp and change the crimp profile across the yarn bundle as shown in part b of FIG. 15.

Figure 16:
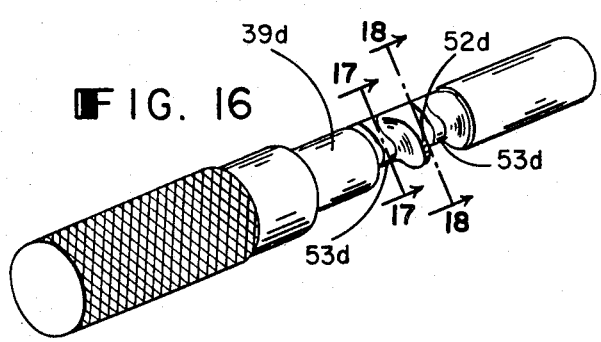
FIG. 16 is a perspective view of yet another embodiment of the invention.
Figure 17:
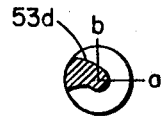
FIG. 17 is a sectional view along lines 17—17 of FIG. 16.
Figure 18:
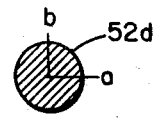
FIG. 18 is a sectional view along lines 18—18 of FIG. 16.
Figure 19:
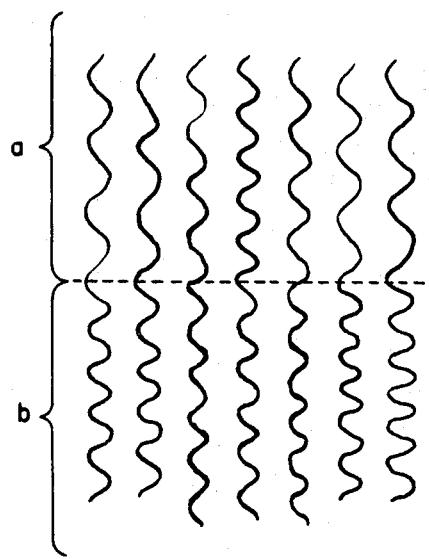
FIG. 19 is a stylized view showing the crimp variation along and across the crimped yarn bundle produced by the cam of FIG. 16.

FIG. 16 shows another embodiment wherein the mid portion 52d of the cam 39d is concentric with axis of rotation of the cam (FIG. 18) and the flanking side portions 53d are eccentrically positioned with respect to the axis of rotation (FIG. 19). This cam member will yield a yarn bundle with a higher degree of crimp in the middle that at the lateral edges thereof when the cam is at the position shown in FIG. 17. As the cam is rotated in a clockwise direction, the degree of crimp at the lateral edges increases while the degree of crimp at the middle of the fiber bundle remains substantially constant due to the concentricity of the cam mid portion 52d (see part b of FIG. 19).

A comparison of parts a and b of FIG. 19 shows that the degree of crimp is generally increased as the cam is rotated into the stuffing chamber with the exception that the strands at the mid portion of the fiber bundle will retain substantially the same degree of crimp due to the fact that the cam mid portion 52d is concentric in relation to its axis of rotation. It is also noted that the cam mid portion 52d will affect a greater portion of the fibers as the cam is rotated into the stuffing chamber, since the effective thickness of the mid portion of the cam in contact with the fibers gradually increases.

FIG. 20 shows yet another embodiment wherein the axis of rotation of any one of the above mentioned cams is mounted for substantially rectilinear sliding movement with respect to the chamber 51a. This is accomplished by mounting the cam 39 for sliding movement with respect to stuffer box 27 by means of bushing slots 55a, 55b. The bearings 43a, 43b are mounted for movement in the bushing slots 55a, 55b and are carried by yoke 57 having bushing holes 59a, 59b. In this manner the cam 39 is mounted for sliding movement with respect to the stuffer box chamber 51a as well as for rotational movement about its own axis. Set screw 63 fixes the impeding mechanism 35 against rotation, and the sliding movement in bushing slots 55a, 55b is regulated by a ram 61 or other similar actuating means. By this apparatus, the profile of the crimp across the fiber bundle can be changed by rotating cam member 39, and the degree of crimp for a given crimp profile can be selectively regulated by moving the cam member along bushing slots 55a, 55b into or out of the stuffing chamber. It will be appreciated that the ram can be operated manually or automatically at periodic intervals to vary the degree of crimp along the length of the crimped yarn.

By the above method and apparatus there is provided a simple and reliable way of producing a crimped yarn with any desired degree of crimp and/or varying crimp profile across the yarn bundle.

While several embodiments of the invention have been set forth in detail, the foregoing description is to be considered exemplary rather than limiting; and the scope of the invention is to be determined from the appended claims.

What is claimed is:

1. A stuffer-crimper for yarn bundles comprisoing:
a stuffing chamber;
means for feeding a yarn bundle into and through said chamber;
impending means in said chamber adapted to resist movement of the yarn bundle through the chamber; said impending means including
a cam member of variable cross section adapted to project into said chamber,
said cam member including a first portion penetrating a predetermined distance into said chamber and a second portion which penetrates a lesser distance into said chamber;
whereby the degree of crimp imparted to the filaments in a yarn bundle will vary across the width of said bundle roughly proportional to the extent of penetration of a corresponding portion of said cam member into said stuffing chamber.

2. The device claim 1 wherein said cam member is adjustably rotatable whereby said cam member may be projected into the stuffing chamber to vary the degree of crimp in the yarn bundle.

3. The device of claim 2 wherein the cam portions are of varying thickness as they progress around the circumference of the cam;
whereby the percentage of filaments affected by a given cam portion varies as the cam is rotatably adjusted.

4. The device of claim 2 wherein one of the cam portions has a cam surface, the radius of which increases at a predetermined rate relative to its axis of rotation; and
the other cam portion has a cam surface the radius of which increases at a greater rate than the radius of said one portion, whereby the degree of crimp and the crimp profile across the bunde is varied as the cam portion is projected into the stuffing chamber.

5. The device of claim 2 wherein one of the cam portions has a cam surface having a constant radius relative to its axis of rotation, and the other cam portion has a gradually increasing radius relative to said axis of rotation;
whereby the degree of crimp effected by said other cam portion increases as the cam is rotated, while the crimp effected by said first cam portion remains substantially the same.

6. The device of claim 1 wherein said first cam portion comprises a mid portion penetrating a predetermined distance into said chamber, and said second cam portion comprises two cam segments which flank said mid portion and penetrate a different distance into said chamber.

7. The device of claim 6 wherein the cam mid portion projects farther into said chamber than the side segments.

8. The device of claim 7 wherein the cam mid portion has an effective edge portion of substantially constant thickness.

9. The device of claim 7 wherein the cam mid portion has an effective edge portion of gradually increasing thickness.

10. The device of claim 6 wherein the cam mid portion has an effective edge portion of substantially constant thickness, and a radius which increases at a predetermined rate;
said side portions having a surface, the radius of which increases at a more rapid rate than the radius of said cam mid portion;
whereby the penetration of the side portions will increase at a greater rate relative to the penetration of the mid portion as the cam is rotated to increase its penetration into the stuffing chamber, thus causing the degree of crimp to increase at a more rapid rate at the lateral edges of the yarn bundle as the cam is rotated to increase its penetration into the stuffing chamber.

11. The device of claim 6 wherein the effective edge of the cam mid portion becomes gradually thicker around the circumference of the cam,
whereby the percentage of tightly crimped filaments at the mid portion of the fiber bundle increases as the cam is rotated to cause it to penetrate farther into the stuffing chamber.

12. The device of claim 6 wherein the cam mid portion has a constant radius relative to its axis of rotation;
said side portions having cam surfaces which have a gradually increasing radius relative to said axis of rotation;
whereby the degree of crimp at the lateral edges of the fiber bundle increases and the degree of crimp at the middle of the yarn bundle remains substantially constant as the cam is rotated to increase its penetration into the stuffing chamber.

13. The device of claim 2 wherein said cam member is mounted for sliding movement with respect to said stuffing chamber in a direction transversely of the movement of said yarn through said stuffing chamber,
whereby the degree of crimp may be changed by sliding said cam member into or out of said stuffing chamber, and the crimp profile across the yarn bundle can be changed by rotating said cam member so that it penetrates into said stuffing chamber.

14. The device of claim 13 including means for selectively actuating said cam member for sliding movement.

15. A stuffer-crimper for yarn bundles comprising a plurality of continuous thermoplastic filaments, said stuffer crimper comprising:
a stuffing chamber;
feed rolls for feeding said fiber bundle into said stuffing chamber;
impeding means projecting into the lower portion of said chamber and adpated to resist movement of the fiber bundle through the stuffing chamber,
said impeding means comprising:
a rotatable, adjustable arcuate cam member including,
a first cam portion adapted to penetrate a predetermined distance into said chamber and second cam portion adapted to penetrate a lesser distance into said chamber
whereby the degree of crimp imparted to the individual filaments of the bundle is roughly proportional to the extent of penetration of a corresponding given portion of said cam member.

16. The device of claim 15 wherein said first cam portion comprises a mid portion; and
said second cam portion comprises two cam segments which flank said mid portion.

17. The device of claim 16 wherein one of the cam portions has a cam surface, the radius of which increases at a predetermined rate relative to its axis of rotation, and the other cam portion has a cam surface the radius of which increases at a greater rate than the radius of said one portion, whereby the degree of crimp and the crimp profile across the bundle may be varied as the cam portion is projected into the stuffing chamber.

18. The device of claim 16 wherein one of the cam portions has a cam surface which has a constant radius relative to its axis of rotation, and the other cam portion has a gradually increasing radius relative to said axis of rotation;

whereby the degree of crimp effected by said other cam portion increases as the cam is rotated, while the crimp effected by said first cam portion remains substantially the same.

19. The device of claim 16 wherein said first cam portion comprises a mid portion penetrating a predetermined distance into said chamber, and said second cam portion comprises two cam segments which flank said mid portion and penetrate a different distance into said chamber.

20. The device of claim 16 wherein the cam mid portion has an effective edge of substantially constant thickness having a surface the radius of which increases at a predetermined rate;

said side portions each having a surface the radius of which increases at a more rapid rate than the radius of said cam mid portion;

whereby the amount of penetration of the side portions will increase at a greater rate relative to the penetration of the mid portion as the cam is rotated to increase its penetration into the stuffing chamber, thus causing the degree of crimp to increase at a more rapid rate at the lateral edges of the yarn bundle as the cam is rotated to increase its penetration.

21. The device of claim 16 wherein the effective edge of the cam mid portion becomes gradually thicker around the circumference of the cam whereby the percentage of tightly crimped fibers at the mid portion of the yarn bundle increases as the cam is rotated to cause it to penetrate farther into the stuffing chamber.

22. The device of claim 16 wherein the cam mid portion has a constant radius relative to its axis of rotation;

said side portions each having cam surfaces which have a gradually increasing radius relative to said axis of rotation;

whereby the degree of crimp at the lateral edges of the yarn bundle increases and the degree of crimp at the middle of the fiber bundle remains substantially the same as the cam is rotated to increase its penetration into the stuffing chamber.

23. The device of claim 16 wherein said cam member is mounted for sliding movement with respect to said stuffing chamber in a direction transversely of the movement of said yarn through said stuffing chamber whereby the degree of crimp may be changed by sliding said cam member into or out of said stuffing chamber, and the profile of the crimp across the yarn bundle may be changed by rotating said cam member so that it penetrates into said stuffing chamber.

24. The device of claim 23 including means for actuating said cam member for sliding movement.

25. A stuffer-crimper for yarn bundles comprising:
a stuffer chamber;
means for feeding said yarn bundle into and through said chamber;
impeding means projecting into said chamber and adapted to resist movement of the yarn bundle through the chamber;
said impeding means including an arcuate cam member mounted for sliding movement transversely of the direction of feed of said yarn bundle through said stuffer chamber;
means for selectively imparting said transverse movement to said cam member,
whereby the degree of crimp along said yarn may be altered at any time.

26. The device of claim 25 wherein said cam member is of varying cross section whereby the degree of crimp will vary across the width of the yarn bundle.

27. The device of claim 26 wherein said cam member is additionally rotatably adjustable about its own axis to vary the crimp profile across the yarn bundle.

References Cited

UNITED STATES PATENTS

| | | | |
|---|---|---|---|
| 3,130,453 | 4/1964 | Haigler | 19—65 |
| 3,234,625 | 2/1966 | Trifunovic et al. | 28—1 |
| 3,248,770 | 5/1966 | Shattuck et al. | 28—1 |
| 3,259,953 | 7/1966 | Baer | 28—1 |
| 3,287,783 | 11/1966 | Mattingly | 28—1 |

LOUIS K. RIMRODT, *Primary Examiner.*